J. E. VAN NOSTRAN.
STOP COCK.
APPLICATION FILED MAY 17, 1910.
970,281.
Patented Sept. 13, 1910.
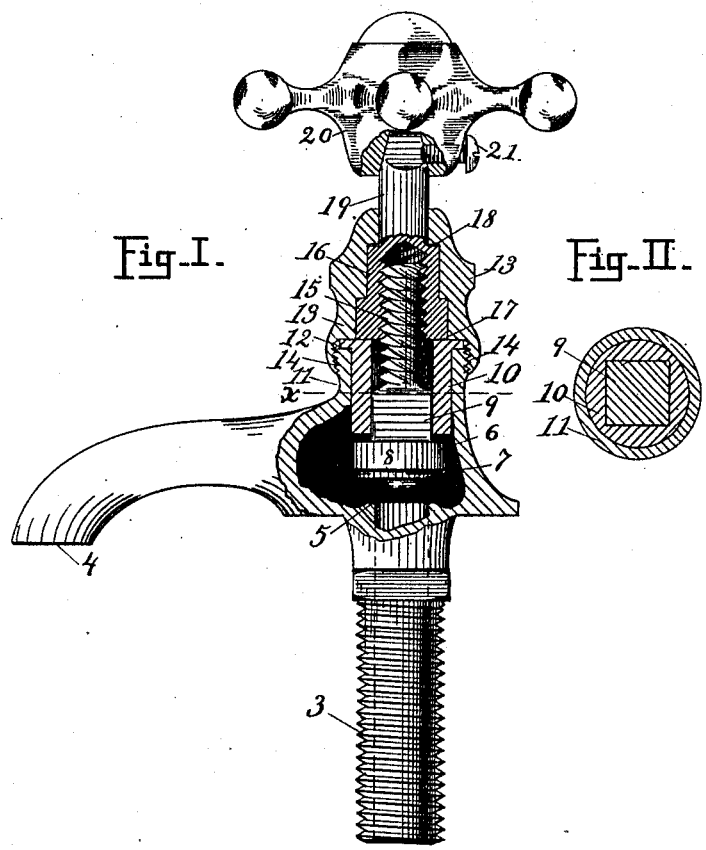
Fig. I.   Fig. II.
Witnesses
N. S. Waller.
D. E. Waller.
Inventor
Joseph E. Van Nostran.
by W. X. Stevens.
Attorney

UNITED STATES PATENT OFFICE.

JOSEPH E. VAN NOSTRAN, OF UPPER SANDUSKY, OHIO.

STOP-COCK.

970,281.  Specification of Letters Patent.  Patented Sept. 13, 1910.

Application filed May 17, 1910. Serial No. 561,859.

*To all whom it may concern:*

Be it known that I, JOSEPH E. VAN NOSTRAN, a citizen of the United States, residing at Upper Sandusky, in the county of Wyandot and State of Ohio, have invented certain new and useful Improvements in Stop-Cocks, of which the following is a specification.

This invention relates to stopcocks of that class which are used to admit water to set basins and for other similar purposes, and its object is to make such cocks more reliable, more durable and less expensive.

To this end my invention consists in the construction and combination of parts forming a stopcock hereinafter more fully described and particularly stated in the claim, reference being had to the accompanying drawings, in which—

Figure I shows in longitudinal, vertical section, partly in side elevation, a stopcock according to my invention. Fig. II, shows a cross section at line *x*.

Numeral 3 represents the inlet shank, screw threaded for connection with a service pipe, and 4 the outlet or delivery. Around the inlet is a seat 5 upon which the valve 6 fits by the aid of the usually interposed packing 7, which is secured to the valve by a screw 8. The body portion 9 of the valve is square in cross section, as shown in Fig. II, and is fitted to reciprocate longitudinally in a thimble 10 which has a square hole for it to slide through. The body of this thimble is externally cylindrical and a very little larger than the head of the valve, whereby it neatly fits the bore in the top of the body 11, which is preferably as small as will freely admit the valve. The thimble is provided with a flanged head 12 which rests upon the body 11, and upon which a cap 13 closes firmly when screwed at 14 to the body. The stem 15 of the valve is screw threaded into a socket 16, the lower end of which has a rotary bearing at 17 upon the top of the thimble, and the upper shoulder 18 bears freely against the cap 13. The shank 19 of the socket has a cylindrical bearing in the cap, and a square, tapering head to be engaged by a handle 20. The handle is secured against accidental removal by a binding screw 21. The socket 16 is in axial line of the valve and operates it by rotating the handle 20 without any eccentric motion. The thimble 10 is concentric with the valve, and the square sides of the valve are not only concentric with its own axis but parallel therewith, so that, however much the parts may become worn the valve will continue perfectly fitted to its seat. The body portion 9 may have any number of sides that will completely surround it provided the sides are concentric and parallel with the axis. The valve has no rotary motion to grind its packing in approaching or leaving the seat. The cylindrical thimble 10 may be rotated a little after loosening the cap over it, to bring the valve to seat itself in a new circumferential position, or to bring the handle in any desired position when the valve is seated. This valve is more easily fitted to its bearings than is a valve that requires one or more grooves and pins or splines to keep it from rotating in service. Any one sided strain on a valve is liable to cause it to leak, but this valve, having all parts concentric, does not cause any one sided action or strain. It is therefore reliable, durable and economical.

As my invention I claim.

In a stopcock, a body portion having an inlet and an outlet passage and a valve seat between said passages; a valve fitted to reciprocate in central line of the seat and provided with a screw-threaded stem and a many sided body portion the sides of which are concentric and parallel with the axis of the valve; a thimble having a many sided hole through it to fit upon the said body portion of the valve, and having a cylindrical circumference which bears within the main body, and a flanged head resting on the body; a cap screw threaded upon the body and binding upon the said flanged head; a socket internally screw threaded to engage the aforesaid stem and having its inner end bearing on the said thimble, its outer end having a cylindrical bearing in the cap and beyond the cap a handle removably attached to it whereby the socket is revolved to reciprocate the valve.

In testimony whereof I affix my signature in presence of two witnesses.

JOSEPH E. VAN NOSTRAN.

Witnesses:
 E. E. LASHLEY,
 S. MARGARET LASHLEY.